United States Patent
Noda

(10) Patent No.: US 7,988,303 B2
(45) Date of Patent: Aug. 2, 2011

(54) IMAGE PROJECTION APPARATUS AND IMAGE DISPLAY SYSTEM

(75) Inventor: Toshiyuki Noda, Utsunomiya (JP)

(73) Assignee: Canon Kabushiki Kaisha (JP)

(*) Notice: Subject to any disclaimer, the term of this patent is extended or adjusted under 35 U.S.C. 154(b) by 354 days.

(21) Appl. No.: 12/177,967

(22) Filed: Jul. 23, 2008

(65) Prior Publication Data

US 2009/0027627 A1 Jan. 29, 2009

(30) Foreign Application Priority Data

Jul. 27, 2007 (JP) ................................. 2007-196744

(51) Int. Cl.
G03B 21/16 (2006.01)

(52) U.S. Cl. ........................................................ 353/61

(58) Field of Classification Search .................. 353/101, 353/57, 60, 61; 355/30, 52–54; 362/294, 362/373; 348/748
See application file for complete search history.

(56) References Cited

U.S. PATENT DOCUMENTS

| | | | |
|---|---|---|---|
| 4,786,947 A * | 11/1988 | Kosugi et al. | 355/30 |
| 6,497,489 B1 | 12/2002 | Li et al. | |
| 7,241,018 B2 * | 7/2007 | Shin | 353/119 |
| 2004/0189954 A1 | 9/2004 | Kuroda | |
| 2005/0094106 A1 | 5/2005 | Nakamura | |

FOREIGN PATENT DOCUMENTS

| | | |
|---|---|---|
| CN | 1185542 C | 1/2005 |
| CN | 1661465 A | 8/2005 |
| JP | 2002-245842 A | 8/2002 |
| JP | 2004-272095 A | 9/2004 |
| JP | 2005-025035 A | 1/2005 |
| JP | 2005-301316 A | 10/2005 |
| JP | 2007-322853 A | 12/2007 |

OTHER PUBLICATIONS

European Search Report issued on Nov. 19, 2008 for the counterpart European Application No. 08161054.
Office Action issued in corresponding Chinese Patent Application No. 200810133483.7 dated Jul. 17, 2009.

* cited by examiner

Primary Examiner — Georgia Epps
Assistant Examiner — Don Williams
(74) Attorney, Agent, or Firm — Rossi, Kimms & McDowell LLP

(57) ABSTRACT

The image projection apparatus includes a heat generating member disposed inside the apparatus, an exhaust fan exhausting an air that has cooled the heat generating member to the outside of the apparatus, and a duct guiding the air from the heat generating member to the exhaust fan. An outflow opening of the duct is oriented in a direction different from an inflow direction of the air into an inflow opening thereof. At least one air guiding wall is provided inside the duct, which forms plural airflow paths within a cross section extending along the inflow direction and an outflow direction of the air. The apparatus is capable of reducing unevenness in flow rate of the air when guiding the air toward the exhaust fan using a bent-type duct.

7 Claims, 10 Drawing Sheets

IMAGE PROJECTION APPARATUS AND IMAGE DISPLAY SYSTEM

BACKGROUND OF THE INVENTION

The present invention relates to an image projection apparatus such as a liquid crystal projector having an exhaust fan.

In image projection apparatuses (hereinafter referred to as projectors), many components that become heat sources are arranged. The heat sources include a light source lamp, a light modulation element such as a liquid crystal panel, optical components such as optical elements, and electrical components such as a power supply ballast and a CPU. Among these components, in particular, the light source lamp generates a large amount of heat which largely affects cooling of other components. Therefore, it is necessary to efficiently exhaust heat from the light source lamp to the outside of the projector.

On the other hand, light leakage from an exhaust outlet provided to the projector causes problems such as glare to a user and lowering of contrast of projected images. Therefore, in the vicinity of the exhaust outlet in the projector, a configuration is desired which prevents the light leakage while allowing a heat-exhausting air to pass smoothly.

Japanese Patent Laid-Open No. 2005-25035 discloses a duct (straight-type duct) in which an inflow opening and an outflow opening are arranged in parallel with each other and a plurality of louvers each having an S-shape is provided thereinside. Using such a duct including the louvers enables a smooth exhaust of an air that has cooled the light source lamp while blocking the leakage light from the light source lamp.

Meanwhile, because of the demand for a further size reduction of projectors, a cooling structure using a bent-type duct such as the one shown in FIG. 8 has been increasingly employed instead of the cooling structure using the straight-type duct such as the one disclosed in Japanese Patent Laid-Open No. 2005-25035.

Referring to FIG. 8, a cooling air W1 is supplied to a light source lamp 101 from a cooling fan (not shown). An air (airflow) WA and an air (airflow) WC that have passed through the inside and outer circumference of the lamp 101 to cool it flow into a duct 127. The duct 127 is a bent-type duct having an inflow opening and an outflow opening formed nonparallel to each other. The airflows WA and WC having flowed into the duct 127 turn into airflows WB and WD whose flow directions are changed by a duct wall surface 127a to be guided toward an exhaust fan 118. The exhaust fan 118 then exhausts the air WB and air WD to the outside of the projector.

However, when such a bent-type duct 127 is used, because of the influence of inertia forces of the airflows WA and WC flowing into the duct 127, unevenness in flow rate of the airflows WB and WD flowing out from the duct 127 toward the exhaust fan 118 is generated. That is, the flow rate of the airflow WB flowing along the duct wall surface 127a becomes higher than that of the airflow WD flowing through a region away from the duct wall surface 127a.

Such unevenness in flow rate increases noise generated in the exhaust fan (axial flow fan) 118.

FIG. 9 shows a section of the exhaust fan 118. As mentioned above, the airflow WB flowing from the duct 127 toward the exhaust fan 118 has a higher flow rate than that of the airflow WD. When the exhaust fan 118 is rotated, a distal end 118Fa of each blade in the rotating direction of the exhaust fan 118 cuts the respective airflows WB and WD perpendicularly.

In this case, when the distal end 118Fa of the blade finishes cutting the airflow WD having a lower flow rate and begins cutting the airflow WB having a higher flow rate, it hits a side face of the airflow WB, thereby generating wind roar. This wind roar has peaks at a frequency of an integral multiple of "the number of the blades x the rotating speed thereof", causing noise.

The difference in the flow rate of the airflows WB and WD sucked into the exhaust fan 118 also changes an angle of attack between each airflow and the blade passing through that airflow, whereby airflow burbling (turbulence) is generated on the surface of the blade. This generates turbulence noise and thereby increases the noise, as well as deteriorates the P (pressure)-Q (flow quantity) characteristics of the fan, thereby obstructing the normal operation of the exhaust fan 118.

BRIEF SUMMARY OF THE INVENTION

The present invention provides an image projection apparatus in which unevenness in flow rate of an air can be reduced when guiding the air toward an exhaust fan using a bent-type duct.

The present invention provides, according to an aspect thereof, an image projection apparatus including a heat generating member disposed inside the apparatus, an exhaust fan exhausting an air that has cooled the heat generating member to the outside of the apparatus, and a duct guiding the air from the heat generating member to the exhaust fan. An outflow opening of the duct is oriented in a direction different from an inflow direction of the air into an inflow opening thereof. At least one air guiding wall is provided inside the duct which forms plural airflow paths within a cross section extending along the inflow direction and an outflow direction of the air.

The present invention provides, according to another aspect thereof, an image display system including the above image projection apparatus, and an image supply apparatus that supplies image information to the image projection apparatus.

Other aspects of the present invention will become apparent from the following description and the attached drawings.

DETAILED DESCRIPTION OF THE EMBODIMENTS

Exemplary embodiments of the present invention will hereinafter be described with reference to the accompanying drawings.

Embodiment 1

(Overall Configuration of Projector)

Figure 5:
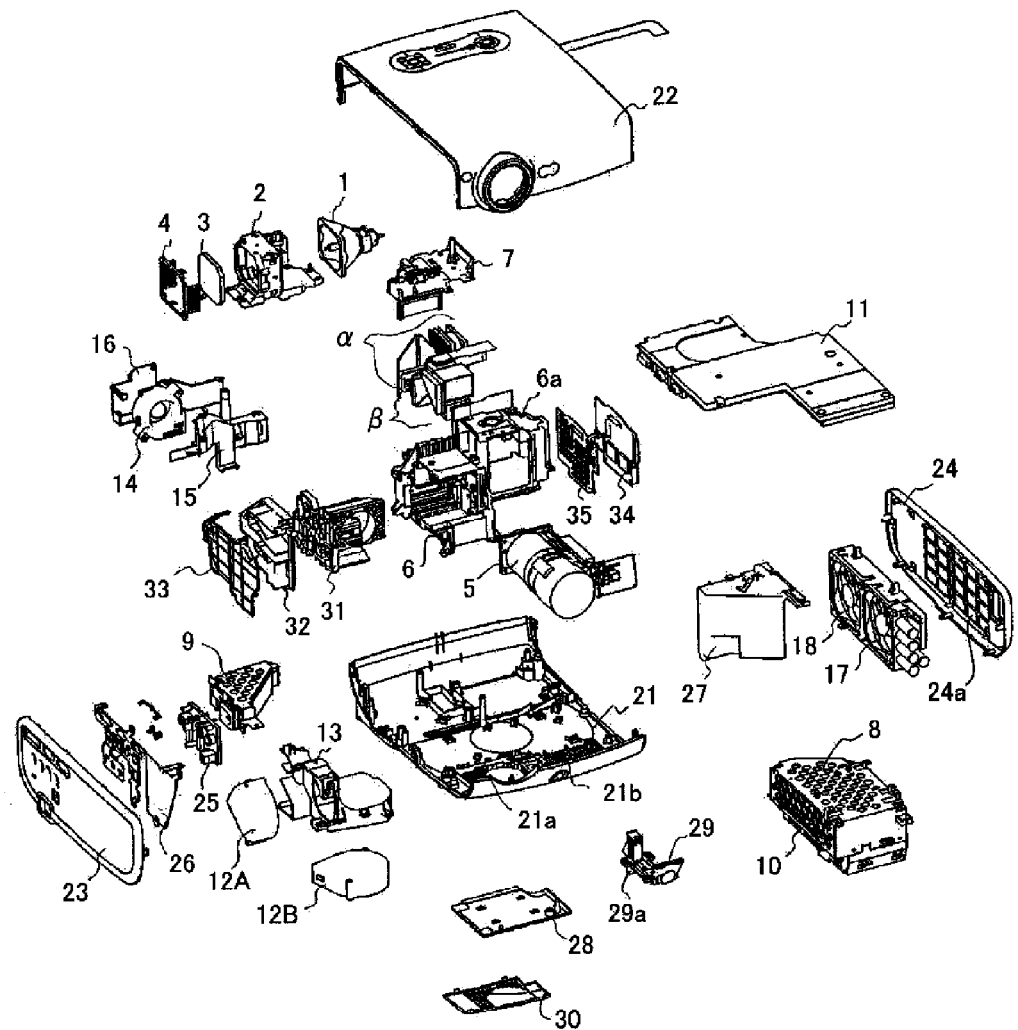
FIG. 5 is an exploded perspective view showing the entire configuration of the liquid crystal projector of Embodiment 1.

FIG. 5 shows the configuration of a liquid crystal projector (image projection apparatus) that is a first embodiment (Embodiment 1) of the present invention.

In this figure, reference numeral 1 denotes a light source lamp (hereinafter referred to simply as "lamp"), which is an ultra high-pressure mercury discharge lamp in this embodiment. However, discharge lamps other than the ultra high-pressure mercury discharge lamp may be used as the lamp 1, such as a halogen lamp, a xenon lamp, and a metal halide lamp.

Reference numeral 2 denotes a lamp holder which holds the lamp 1, 3 an explosion-proof glass, and 4 a glass holder. Reference symbol α denotes an illumination optical system which converts light from the lamp 1 into collimated light with a uniform luminance distribution. Reference symbol β denotes a color separating/combining optical system. The color separating/combining optical system β separates the light from the illumination optical system α into a red (R) light component, a green (G) light component and a blue (B) light component, guides them to liquid crystal panels for R, G, and B, respectively, and then combines the light components from the liquid crystal panels.

Reference numeral 5 denotes a projection lens barrel which projects the light from the color separating/combining optical system β onto a projection surface such as a screen, not shown. A projection optical system, described later, is housed in the projection lens barrel 5.

Reference numeral 6 denotes an optical box which accommodates the lamp 1, the illumination optical system α, and the color separating/combining optical system β, and to which the projection lens barrel 5 is fixed. The optical box 6 has a lamp case portion 6a formed thereon, which surrounds the lamp 1.

Reference numeral 7 denotes an optical box lid which covers the optical box 6 accommodating the illumination optical system α and the color separating/combining optical system β. Reference numeral 8 denotes a PFC (Power Factor Correction) power supply board which generates DC power for each of circuit boards from a commercial power supply. Reference numeral 9 denotes a power supply filter board, and 10 a ballast power supply board which drives (lights) the lamp 1 together with the PFC power supply board 8.

Reference numeral 11 denotes a control board which drives the liquid crystal panels and controls lighting of the lamp 1 with power from the PFC power supply board 8.

Reference numerals 12A and 12B denote first and second optical system cooling fans, respectively, which take in air through an air inlet 21a formed in a lower exterior case 21, later described, to cool optical elements such as the liquid crystal panels and polarizing plates provided in the color separating/combining optical system β.

Reference numeral 13 denotes a first RGB duct which guides the cooling airflows from the first and second optical system cooling fans 12A and 12B to the optical elements in the color separating/combining optical system β.

Reference numeral 14 denotes a lamp cooling fan which sends a blowing airflow to the lamp 1 to cool it. Reference numeral 15 denotes a first lamp duct which holds the lamp cooling fan 14 and guides the cooling airflow to the lamp 1. Reference numeral 16 denotes a second lamp duct which holds the lamp cooling fan 14 and forms the duct together with the first lamp duct 15.

Reference numeral 17 denotes a power supply cooling fan which takes in air through an air inlet 21b formed in the lower exterior case 21 to circulate a cooling airflow within the PFC power supply board 8 and the ballast power supply board 10 to cool them. Reference numeral 18 denotes an exhaust fan which exhausts air that has been provided from the lamp cooling fan 14 to the lamp 1 and whose temperature is increased by cooling the lamp 1 through an exhaust air outlet 24a formed in a second side plate 24, later described.

The lower exterior case 21 accommodates the lamp 1, the optical box 6, the power supply system boards 8 to 10, the control board 11 and the like.

Reference numeral 22 denotes an upper exterior case which covers the lower exterior case 21 accommodating the optical box 6 and the like. Reference numeral 23 denotes a first side plate which covers side openings formed by the cases 21 and 22 together with the second side plate 24. The lower exterior case 21 has the abovementioned air inlets 21a and 21b formed therein, and the side plate 24 has the exhaust air outlet 24a formed therein. The lower exterior case 21, the upper exterior case 22, the first side plate 23 and the second side plate 24 constitute a chassis (case) of the projector.

Reference numeral 25 denotes an interface board on which connectors for receiving various signals are mounted, and 26 an interface reinforcement plate attached to the inside face of the first side plate 23.

Reference numeral 27 denotes an exhaust duct which guides the heated exhaust air from the lamp 1 to the exhaust fan 18 to prevent diffusion of the exhaust air in the chassis.

Reference numeral 28 denotes a lamp lid. The lamp lid 28 is removably provided on the bottom of the lower exterior case 21 and is fixed thereto by screws, not shown. Reference numeral 29 denotes a set adjustment leg. The set adjustment leg 29 is fixed to the lower exterior case 21, and the height of its leg 29a is adjustable. The adjustment of the height of the leg 29a enables adjustment of an inclination angle of the projector.

Reference numeral 30 denotes an RGB air intake plate which holds a filter, not shown, attached to the outside of the air inlet 21a formed in the lower exterior case 21.

Reference numeral 31 denotes a prism base which holds the color separating/combining optical system β. Reference numeral 32 denotes a box side cover which has duct-shaped portions for guiding the cooling airflows from the first and second optical system cooling fans 12A and 12B for cooling the optical elements and the liquid crystal panels in the color separating/combining optical system β. Reference numeral 33 denotes a second RGB duct which forms the duct together with the box side cover 32.

Reference numeral 34 denotes an RGB board to which flexible boards extending from the liquid crystal panels disposed in the color separating/combining optical system β are connected and which is connected to the control board 11.

Reference numeral 35 denotes an RGB cover which prevents electrical noise from entering the RGB board.

(Optical Configuration)

Figure 6:
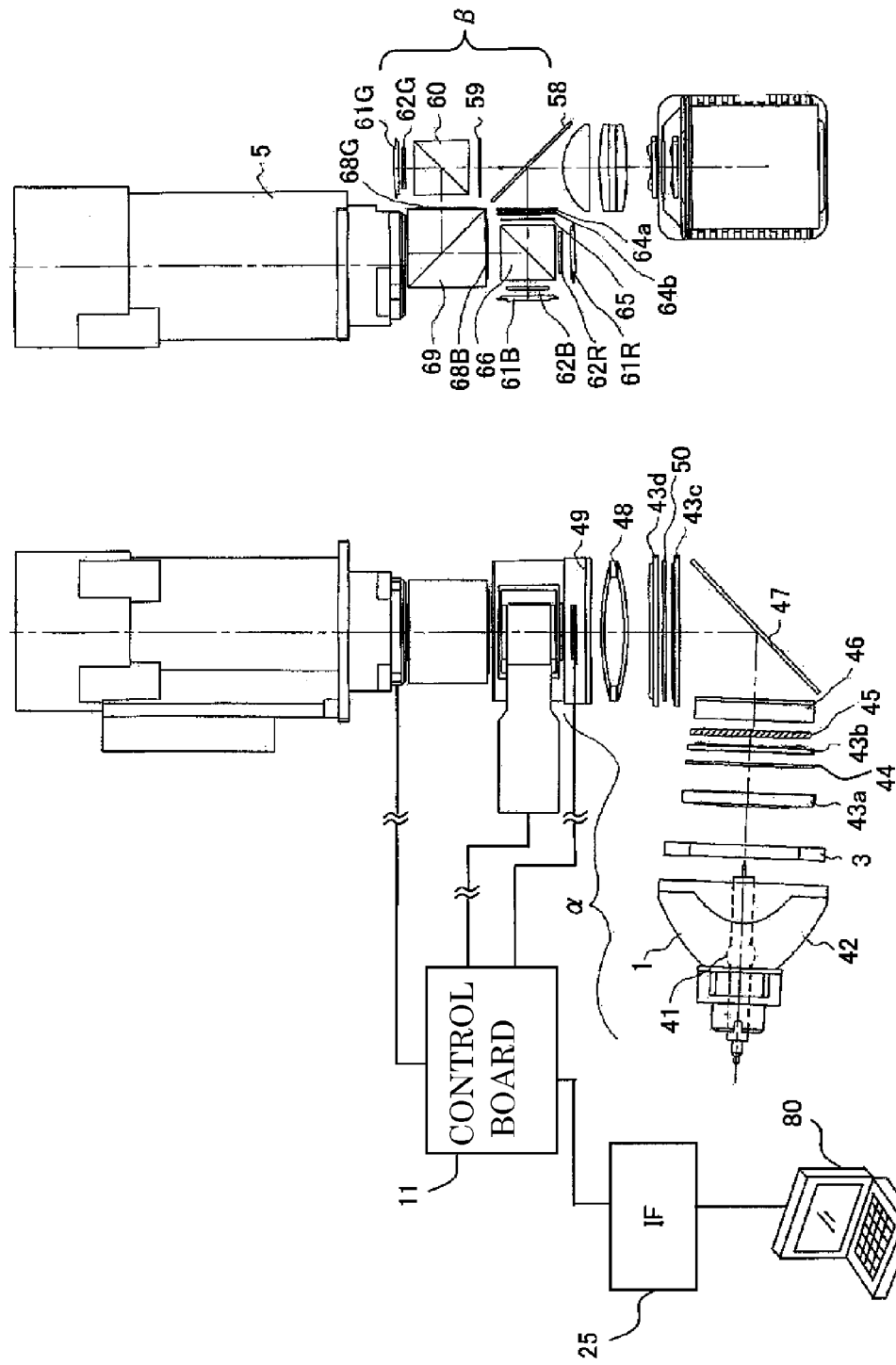
FIG. 6 shows top and side views of the optical configuration of the liquid crystal projector of Embodiment 1.

Next, description will be made of the configuration of the entire optical system formed of the abovementioned lamp 1, the illumination optical system α, the color separating/combining optical system β and the projection lens barrel (projection optical system) 5 with reference to FIG. 6. FIG. 6 shows a horizontal section and a vertical section of the optical system.

In the figure, reference numeral 41 denotes a discharge light-emitting tube (hereinafter referred to simply as "light-emitting tube") which emits white light with a continuous spectrum, and 42 a reflector which has a concave mirror to collect the light from the light-emitting tube 41 in a predetermined direction. The light-emitting tube 41 and the reflector 42 constitute the lamp 1.

Reference numeral 43a denotes a first cylinder array which is formed by arranging plural cylindrical lens cells each having a refractive power in a horizontal direction shown in the left in the figure, 43b a second cylinder array which has plural cylindrical lens cells corresponding to the respective lens cells of the first cylinder array 43a. Reference numeral 44 denotes an ultraviolet absorbing filter, and 45 a polarization conversion element which converts non-polarized light into polarized light having a predetermined polarization direction.

Reference numeral 46 denotes a front compressor which is formed of a cylindrical lens having a refractive power in a vertical direction shown in the right in the figure. Reference numeral 47 denotes a reflecting mirror which bends an optical axis from the lamp 1 by substantially 90 degrees (in more detail, by 88 degrees).

Reference numeral 43c denotes a third cylinder array which is formed by arranging plural cylindrical lens cells each having a refractive power in the vertical direction. Reference numeral 43d denotes a fourth cylinder array which has plural cylindrical lens cells corresponding to the respective lens cells of the third cylinder array 43c.

Reference numeral 50 denotes a color filter which returns color light in a specific wavelength range to the lamp 1 for adjustment of color coordinates to predetermined values. Reference numeral 48 denotes a condenser lens. Reference numeral 49 denotes a rear compressor which is formed of a cylindrical lens having a refractive power in the vertical direction. The abovementioned components constitute the illumination optical system α.

Reference numeral 58 denotes a dichroic mirror which reflects light in wavelength ranges of blue (B: for example, 430 nm to 495 nm) and red (R: for example, 590 nm to 650 nm) and transmits light in a wavelength range of green (G: for example, 505 nm to 580 nm). Reference numeral 59 denotes an entrance-side polarizing plate for G which includes a polarizing element attached on a transparent substrate and transmits only P-polarized light. Reference numeral 60 denotes a first polarization beam splitter which has a polarization splitting surface formed of a multi-layered film. The polarization splitting surface transmits P-polarized light and reflects S-polarized light.

Reference numerals 61R, 61G and 61B denote a reflective liquid crystal panel for R, a reflective liquid crystal panel for G, and a reflective liquid crystal panel for B, respectively, each being a light modulation element (or image-forming element) which reflects and image-modulates entering light. Reference numerals 62R, 62G and 62B denote a quarter-wave plate for R, a quarter-wave plate for G, and a quarter-wave plate for B, respectively.

Reference numeral 64a denotes a trimming filter which returns orange light to the lamp 1 for enhancing the color purity of red. Reference numeral 64b denotes an entrance-side polarizing plate for R and B which includes a polarizing element attached on a transparent substrate and transmits only P-polarized light.

Reference numeral 65 denotes a color-selective phase plate which converts a polarization direction of R light by 90 degrees and does not convert a polarization direction of B light. Reference numeral 66 denotes a second polarization beam splitter which has a polarization splitting surface transmitting P-polarized light and reflecting S-polarized light.

Reference numeral 68B denotes an exit-side polarizing plate for B which transmits only an S-polarized light component of the B light. Reference numeral 68G denotes an exit-side polarizing plate for G which transmits only S-polarized light of the G light. Reference numeral 69 denotes a dichroic prism which transmits the R light and the B light and reflects the G light.

The abovementioned components from the dichroic mirror 58 to the dichroic prism 69 constitute the color separating/combining optical system β.

In this embodiment, the polarization conversion element 45 converts P-polarized light into S-polarized light. The P-polarized light and S-polarized light are herein described relative to the polarization direction of light at the polarization conversion element 45. On the other hand, the light entering the dichroic mirror 58 is considered relative to the polarization direction at the first and second polarization beam splitters 60 and 66, the light being regarded as P-polarized light. While the light emerging from the polarization conversion element 45 is S-polarized light, the S-polarized light is defined as P-polarized light when it enters the dichroic mirror 58.

(Optical Actions)

Next, the optical actions will be described. The light emitted from the light-emitting tube 41 is collected in the predetermined direction by the reflector 42. The reflector 42 has a parabolic shape, and the light flux from the focal point of the parabolic surface is converted into a light flux parallel to the axis of symmetry of the parabolic surface. However, since the light source in the light-emitting tube 41 is not an ideal point light source and has a finite size, the collected light flux contains a large amount of component not in parallel with the axis of symmetry of the parabolic surface.

The light flux enters the first cylinder array 43a through the explosion-proof glass 3. The light flux entering the first cylinder array 43a is divided into plural light fluxes in accordance with the number of the cylindrical lens cells thereof and collected thereby to form plural light fluxes each of which has a band-like shape and which are arranged in the vertical direction. These light fluxes are passed through the ultraviolet absorbing filter 44 and the second cylinder array 43b and then form plural images of the light source near the polarization conversion element 45.

The polarization conversion element 45 is constituted by polarization splitting surfaces, reflective surfaces, and half-wave plates. Each of the light fluxes enters the polarization splitting surface corresponding to its row and is separated into a P-polarized light component which has been transmitted through the polarization splitting surface and an S-polarized light component which has been reflected thereby. Thus, plural light fluxes having the same polarization direction emerge from the polarization conversion element 45

The plural light fluxes converted into the polarized light fluxes by the polarization conversion element 45 are compressed by the front compressor 46, reflected by the reflecting mirror 47 by 88 degrees, and then enter the third cylinder array 43c.

Each of the light flux entering the third cylinder array 43c is divided into plural light fluxes in accordance with the number of the cylindrical lens cells thereof and collected thereby to form plural light fluxes each of which has a band-like shape and which are arranged in the horizontal direction. The plural light fluxes are passed through the fourth cylinder array 43d and the condenser lens 48, and then enter the rear compressor 49.

With the optical actions of the front compressor 46, the condenser lens 48 and the rear compressor 49, rectangular images formed by the plural light fluxes are overlapped with each other to form a rectangular illumination area with a uniform luminance. Each of the reflective liquid crystal panels 61R, 61G and 61B is disposed in the illumination area.

The S-polarized light converted by the polarization conversion element 45 impinges on the dichroic mirror 58. An optical path of the G light transmitted through the dichroic mirror 58 will hereinafter be described.

The G light transmitted through the dichroic mirror 58 enters the entrance-side polarizing plate 59. The G light remains as P-polarized light (S-polarized light relative to the polarizing conversion element 45) after the separation by the dichroic mirror 58. The G light emerges from the entrance-side polarizing plate 59, enters the first polarization beam splitter 60 as P-polarized light, and then is transmitted through the polarization splitting surface thereof to reach the reflective liquid crystal panel 61G.

An image supply apparatus 80 such as a personal computer, a DVD player, and a television tuner is connected to the IF board 25 of the projector. The control circuit 11 drives the reflective liquid crystal panels 61R, 61G and 61B based on image (video) information input from the image supply apparatus 80 and causes them to form original images for the respective colors. Thus, the light entering each reflective liquid crystal panel is modulated (image-modulated) in accordance with the original image and reflected thereby. The projector and the image supply apparatus 80 constitute an image display system.

The reflective liquid crystal panel 61G image-modulates the G light and reflects it. The P-polarized light component of the image-modulated G light is again transmitted through the polarization splitting surface of the first polarization beam splitter 60 and thereby returned toward the light source to be removed from light for projection. On the other hand, the S-polarized light component of the image-modulated G light is reflected by the polarization splitting surface of the first polarization beam splitter 60 toward the dichroic prism 69 as light for projection.

In a state in which all the polarized light components are converted into P-polarized light (in a black display state), adjusting a slow axis of the quarter-wave plate 62G provided between the first polarization beam splitter 60 and the reflective liquid crystal panel 61G to a predetermined direction can reduce the influence of a disturbance of the polarization state caused in the first polarization beam splitter 60 and the reflective liquid crystal panel 61G.

The G light that has emerged from the first polarization beam splitter 60 enters the dichroic prism 69 as S-polarized light, and then is reflected by the dichroic film surface of the dichroic prism 69 to reach the projection lens barrel 5.

Optical paths of the R light and the B light reflected by the dichroic mirror 58 will hereinafter be described. The R light and B light reflected by the dichroic mirror 58 enter the trimming filter 64a. The R light and the B light remain as P-polarized light after the separation by the dichroic mirror 58. The R light and the B light are passed through the trimming filter 64a to remove the orange light component thereof, transmitted through the entrance-side polarizing plate 64b, and then enter the color-selective phase plate 65.

The color-selective phase plate 65 has the function of rotating the polarization direction of only R light by 90 degrees. Thus, the R light and the B light enter the second light beam splitter 66 as S-polarized light and P-polarized light, respectively.

The R light entering the second polarization beam splitter 66 as S-polarized light is reflected by the polarization splitting surface of the second polarization beam splitter 66 to reach the reflective liquid crystal panel 61R. The B light entering the second polarization beam splitter 66 as P-polarized light is transmitted through the polarization splitting surface of the second polarization beam splitter 66 to reach the reflective liquid crystal panel 61B.

The R light entering the reflective liquid crystal panel 61R is image-modulated and reflected thereby. The S-polarized light component of the image-modulated R light is reflected again by the polarization splitting surface of the second polarization beam splitter 66 and thereby returned toward the light source to be removed from light for projection. On the other hand, the P-polarized light component of the image-modulated R light is transmitted through the polarization splitting surface of the second polarization beam splitter 66 to proceed toward the dichroic prism 69 as light for projection.

The B light entering the reflective liquid crystal panel 61B is image-modulated and reflected thereby. The P-polarized light component of the image-modulated B light is transmitted again through the polarization splitting surface of the second polarization beam splitter 66 and thereby returned toward the light source to be removed from light for projection. On the other hand, the S-polarized light component of the image-modulated B light is reflected by the polarization splitting surface of the second polarization beam splitter 66 toward the dichroic prism 69 as light for projection.

Adjusting each of slow axes of the quarter-wave plates 62R and 62B provided between the second polarization beam splitter 66 and the reflective liquid crystal panels 61R and 61B, respectively, can reduce the influence of a disturbance of the polarization state in the black display state for each of the R light and the B light, as is the case for the G light.

Of the R light and B light that are thus combined into one light flux by the second polarization beam splitter 66 and then emerged therefrom, the B light is analyzed by the exit-side polarizing plate 68B and then enters the dichroic prism 69. The R light is transmitted through the polarizing plate 68B with no change as P-polarized light and then enters the dichroic prism 69.

The analysis by the exit-side polarizing plate 68B removes unnecessary components of the B light caused by passing the second polarization beam splitter 66, the reflective liquid crystal panel 61B, and the quarter-wave plate 62B.

The R light and the B light entering the dichroic prism 69 are transmitted through the dichroic film surface thereof, combined with the G light reflected by the dichroic film surface, and then reach the projection lens barrel 5.

The combined R, G and B light is enlarged and projected by the projection optical system in the projection lens barrel 5 onto the projection surface such as a screen.

The optical paths described above are used when the reflective liquid crystal panels operate in a white display state. Description will hereinafter be made of optical paths when the reflective liquid crystal panels operate in the black display state.

First, an optical path of the G light will be described. The P-polarized light component of the G light transmitted through the dichroic mirror 58 enters the entrance-side polarizing plate 59 and the first polarization beam splitter 60, is transmitted through the polarization splitting surface of the first polarization beam splitter 60, and then reaches the reflective liquid crystal panel 61G. Since the reflective liquid crystal panel 61G is in the black display state, the G light is reflected without image-modulation. Thus, the G light remains as P-polarized light after the reflection by the reflective liquid crystal panel 61G. Therefore, the G light is again transmitted through the polarization splitting surface of the first polarization beam splitter 60 and the entrance-side polarizing plate 59, and returned toward the light source to be removed from light for projection.

Next, optical paths of the R light and B light will be described. The P-polarized light components of the R light and B light reflected by the dichroic mirror 58 enter the entrance-side polarizing plate 64b. They emerge from the entrance-side polarizing plate 64b and then enter the color-selective phase plate 65. Since the color-selective phase plate 65 has the function of rotating the polarization direction of only the R light by 90 degrees, the R light and the B light enter the second beam splitter 66 as S-polarized light and P-polarized light, respectively.

The R light entering the second polarization beam splitter 66 as the S-polarized light is reflected by the polarization splitting surface thereof to reach the reflective liquid crystal panel 61R. The B light entering the second polarization beam splitter as the P-polarized light is transmitted through the polarization splitting surface thereof to reach the reflective liquid crystal panel 61B.

Since the reflective liquid crystal panel 61R is in the black display state, the R light entering the reflective liquid crystal panel 61R is reflected without image-modulation. In other words, the R light remains as the S-polarized light after the reflection by the reflective liquid crystal panel 61R. Thus, the R light is again reflected by the polarization splitting surface of the second polarization beam splitter 66, transmitted through the entrance-side polarizing plate 64b, and then returned toward the light source to be removed from light for projection. As a result, black is displayed.

The B light entering the reflective liquid crystal panel 61B is reflected without image-modulation since the reflective liquid crystal panel 61B is in the black display state. In other words, the B light remains as the P-polarized light after the reflection by the reflective liquid crystal panel 61B. Thus, the B light is again transmitted through the polarization splitting surface of the second polarization beam splitter 66, transmitted through the color-selective phase plate 65 and the entrance-side polarizing plate 64b, and then returned toward the light source to be removed from light for projection.

(Cooling Structure)

Next, the cooling structure in the projector of this embodiment will be described with reference to FIG. 7. As described above, this projector accommodates thereinside five fans 12A, 12B, 14, 17, and 18 shown in FIG. 5 for flowing airs in plural airflow paths described below to cool their respective cooling targets.

Figure 7:
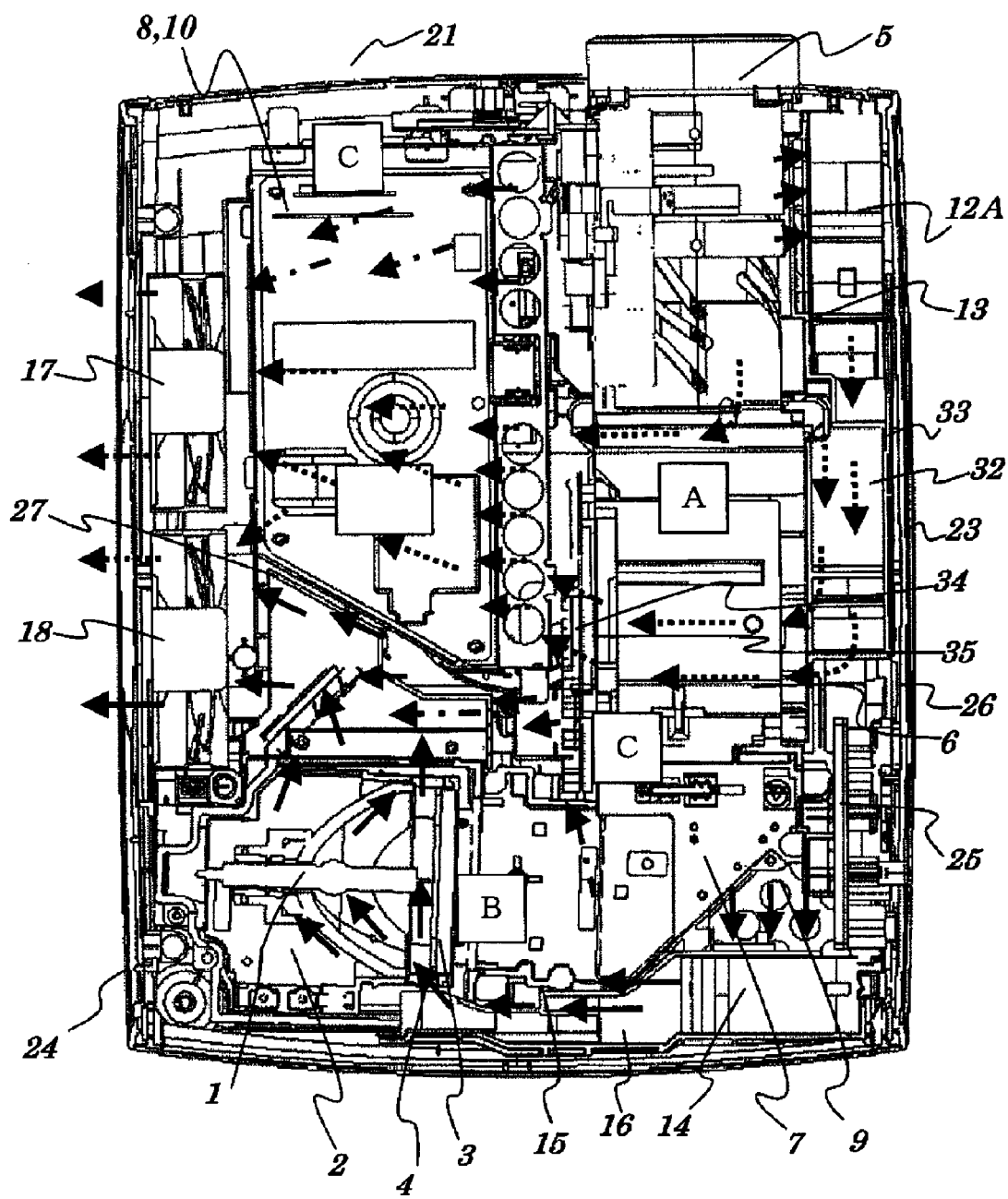
FIG. 7 is a top plan view showing cooling airflows in the liquid crystal projector of Embodiment 1.

In an airflow path B (first airflow path) indicated by solid-line arrows in FIG. 7, an air sucked into the chassis by the lamp cooling fan 14 is fed as a cooling air through the ducts 15 and 16 to the lamp 1 that is a heat generating member (exothermic member). The airflow having cooled the lamp 1 is guided into the exhaust duct 27 to be exhausted to the outside of the chassis by the exhaust fan 18.

In an airflow path A (second airflow path) indicated by dotted-line arrows in FIG. 7, an air sucked by the first and second cooling fans 12A and 12B from the outside of the chassis flows into the airflow path A through the air inlet 21a formed below the projection lens barrel 5. The second cooling fan 12B is disposed below the projection lens barrel 5.

A cooling air formed by this air cools the optical elements in the color separating/combining optical system β housed inside the optical box 6. Most of this cooling air flows toward the PFC power supply board 8 and the ballast power supply board 10 adjacent to the optical box 6 to cool the electrical devices mounted on these boards 8 and 10. After that, the cooling air is exhausted to the outside of the chassis by the exhaust fan 18 and the power supply cooling fan 17.

In an airflow path C indicated by one-dot-chain-line arrows in FIG. 7, an air sucked through the air inlet 21b (not shown in FIG. 7) formed in the lower exterior case 21 flows into the airflow path C.

A cooling air formed by this air is guided toward the ballast power supply board 10 and the PFC power supply board 8 together with an air inside the chassis by a sucking force of the power supply cooling fan 17 or the exhaust fan 18. After cooling these boards 8 and 10, the cooling air is exhausted to the outside of the chassis by the power supply cooling fan 17 and the exhaust fan 18.

Part of the above cooling structure which is formed in the vicinity of the lamp 1 and the exhaust fan 18 will be explained in detail with reference to FIGS. 1 and 2.

Figure 10:
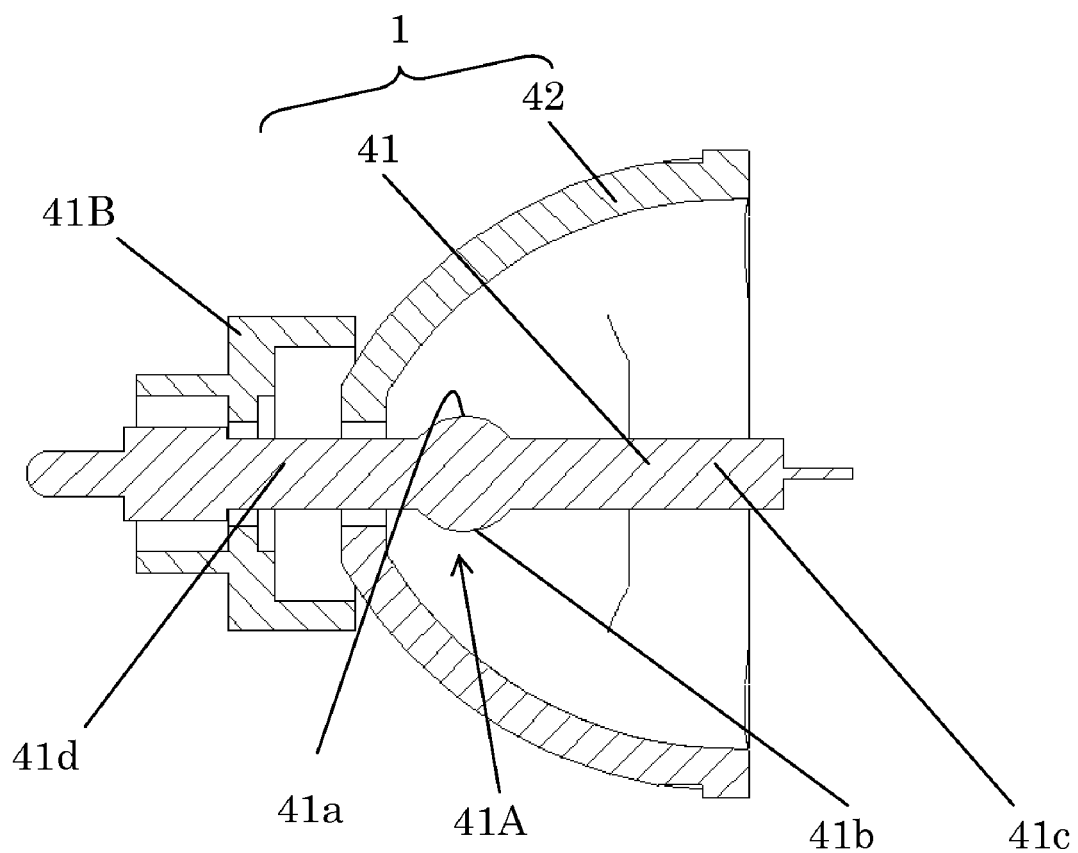
FIG. 10 is a sectional view showing a schematic configuration of a light source lamp.

First, the configuration of the lamp 1 will be described with reference to FIG. 10 before the description of the cooling structure. The lamp 1 is configured with a light emitting tube 41 and a reflector 42 connected to each other with a connecting member 41B. The light emitting tube 41 includes a spherical light emitting portion 41A, and a first sealing portion (electrode portion) 41c and a second sealing portion 41d (electrode portion) 41d which respectively extend to a front side and a back side from the light emitting portion 41A.

The light emitting portion 41A and the first sealing portion 41c of the light emitting tube 41 are disposed inside the reflector 42, while the second sealing portion 41d is covered by the connecting member 41B and disposed outside (on the back side) of the reflector 42. The second sealing portion 41d and its surroundings will be hereinafter referred to as a "neck portion" of the lamp 1.

In order to maintain such a lamp 1 in a good discharge light emission state, it is necessary to respectively control the temperatures of an upper portion 41a and a lower portion 41b of the spherical light emitting portion 41A within ranges of, for example, from 900° C. to 1000° C. and 900±20° C. Temperature control for the sealing portions 41c and 41d is also necessary to maintain them at, for example, not more than 420° C.

Figure 1:
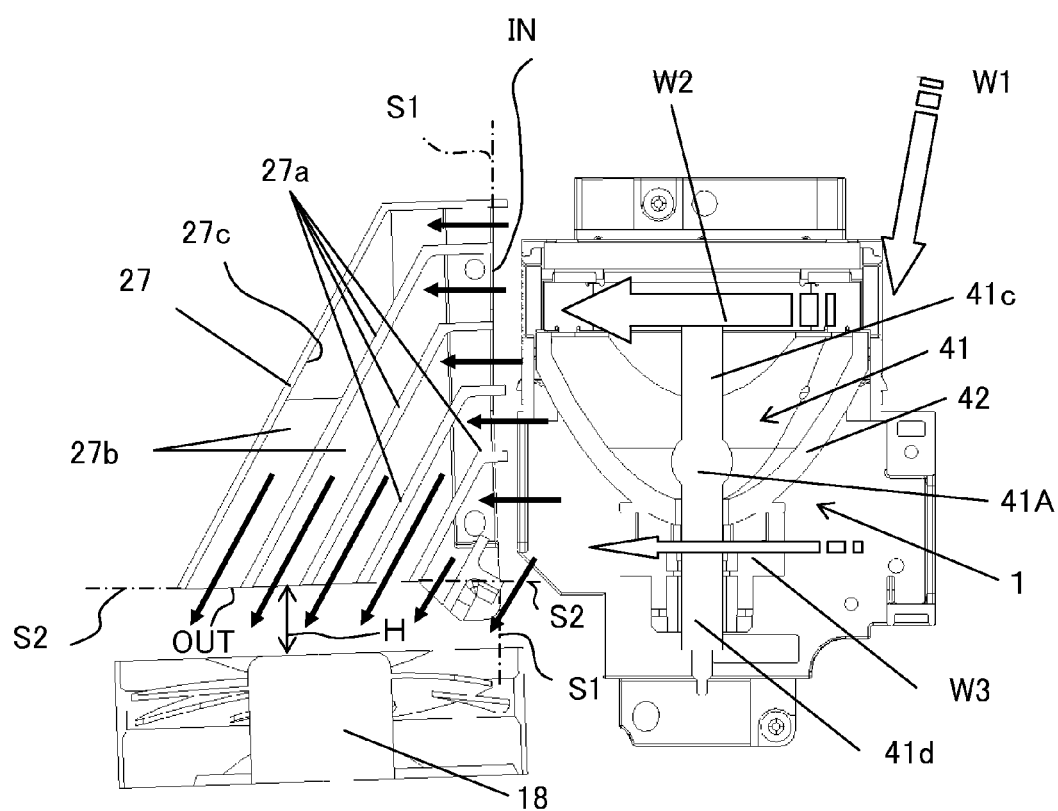
FIG. 1 is a sectional view showing part of a cooling structure in a liquid crystal projector that is a first embodiment (Embodiment 1) of the present invention.

In this embodiment, as shown in FIG. 1, the light emitting portion 41A and the first sealing portion 41c of the light emitting tube 41 are cooled by a cooling air W1 flowing from the lamp cooling fan 14 through the airflow path B shown in FIG. 7. The neck portion is also cooled using an air W3 which is flowed along the outer circumference of the reflector 42 by a suction effect of the exhaust fan 18.

Referring to FIG. 1, the cooling air W1 from the lamp cooling fan 14 is introduced into the inside of the reflector 42. An air W2 whose temperature has increased by drawing heat from the light emitting portion 41A, the first sealing portion 41c, and the reflector 42 of the light emitting tube 41 flows into the exhaust duct 27 forming an exhaust airflow path from the lamp 1 to the exhaust fan 18. The air W3 whose temperature has increased by drawing heat from the neck portion also flows into the exhaust duct 27.

The exhaust duct 27 is a so-called bent-type duct whose outflow opening OUT is oriented in a direction different from an inflow direction of the airs W2 and W3 into the inflow opening IN thereof. In other words, the exhaust duct 27 is a bent-type duct formed so as to change, relative to the inflow direction of the airs W2 and W3 into the inflow opening IN, an outflow direction of the airs W2 and W3 toward the outflow opening OUT that is nonparallel to the inflow opening IN.

The duct in which the outflow opening OUT is oriented in the direction different from the inflow direction of the airs W2 and W3 into the inflow opening IN and the duct in which the inflow opening IN and the outflow opening OUT are nonparallel to each other, i.e., the bent-type ducts include the following examples.

One example is a duct in which a surface S1 providing a base plane to form the inflow opening IN and a surface S2 providing a base plane to form the outflow opening OUT form a certain large angle with each other (for example, an angle of 45° or more: 90° in FIG. 1).

However, a duct in which an inflow opening and an outflow opening are inherently parallel to each other but not parallel to each other in strict terms because of manufacturing errors of the duct is not included in the bent-type ducts. In contrast, the duct in which the actual shapes of the inflow opening IN and the outflow opening OUT have concavity and convexity relative to the base planes S1 and S2 as shown in FIG. 1 is also regarded as a bent-type duct as long as the base planes S1 and S2 form the angle mentioned above.

The exhaust duct 27 of this embodiment has its outermost wall surface (duct wall surface) 27c formed in a bent shape. Other ducts in which no such bent outermost wall surface is formed and in which the outermost wall surface is formed with a mildly curved surface are also regarded as the bent-type ducts as long as the inflow opening IN and the outflow opening OUT are nonparallel to each other.

Figure 8:
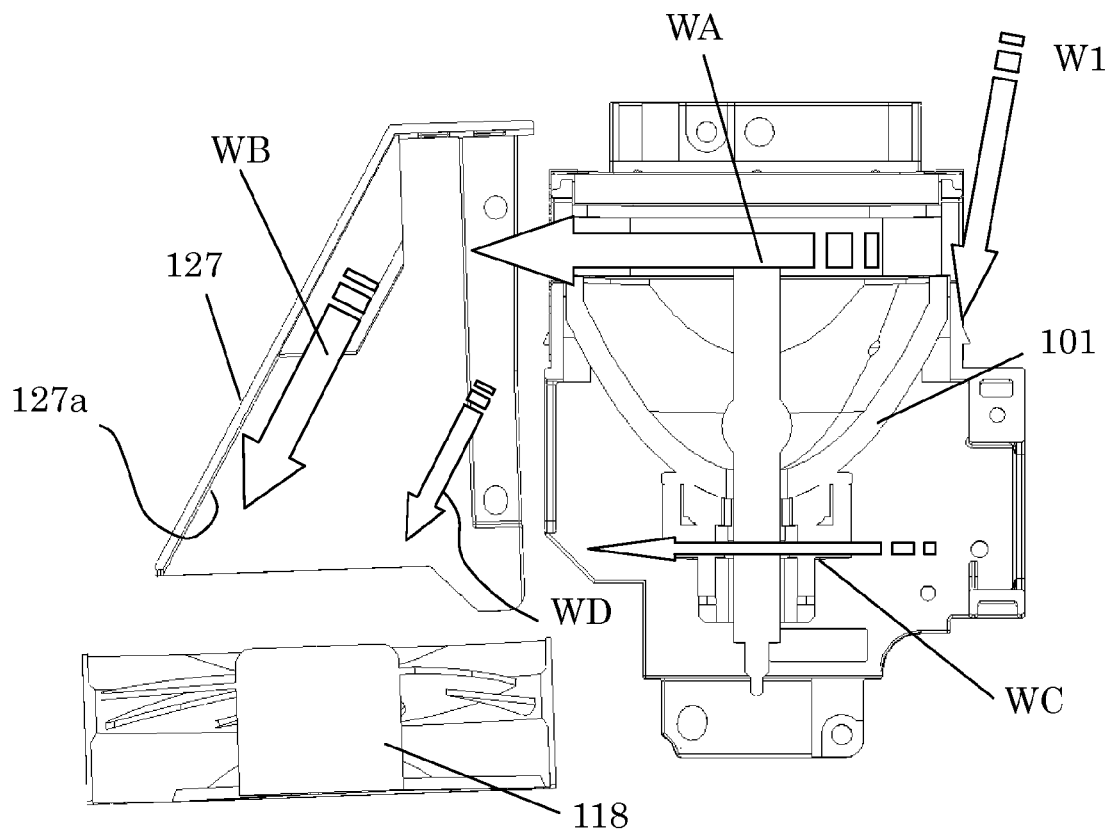
FIG. 8 is a diagram showing a conventional lamp cooling structure.
Figure 9:
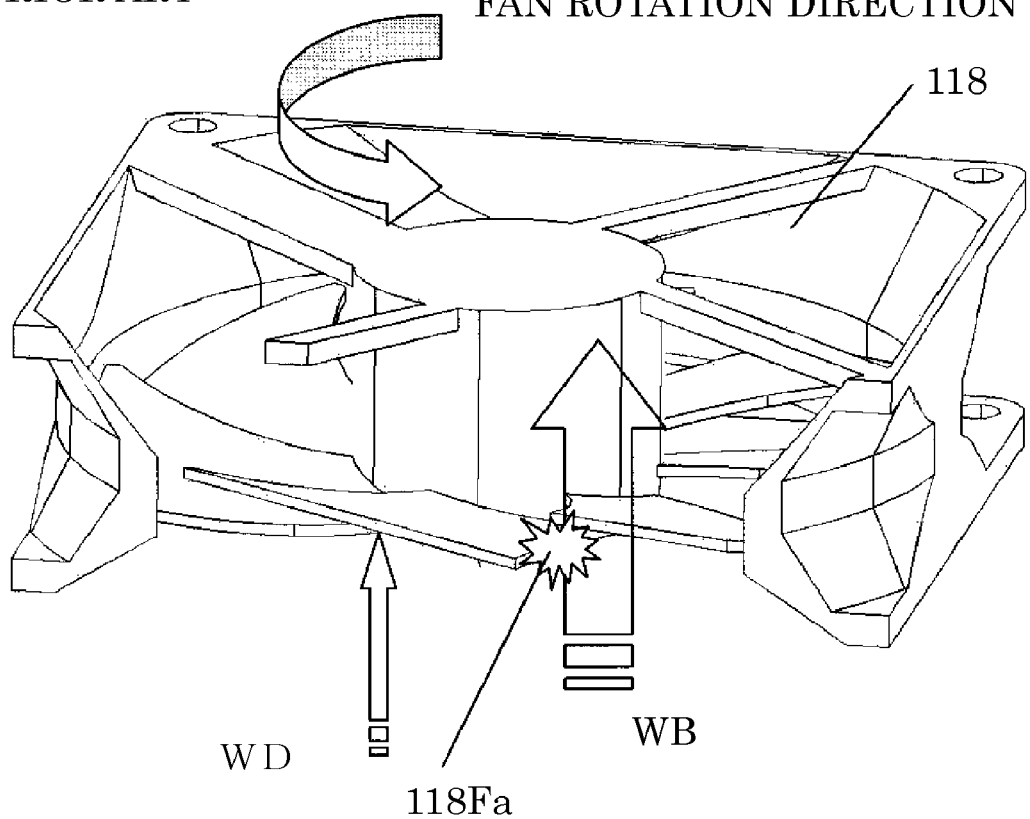
FIG. 9 is a diagram explaining the generation principle of a wind roar in a fan.

In the bent-type exhaust duct 27, the outflow direction of the air from the outflow opening OUT is largely changed relative to the inflow direction of the air W2 and W3 into the inflow opening IN. In such a case, as has been described with reference to FIG. 8, most of the air tends to flow along the duct wall surface 27c far away from the lamp 1 due to the effect of the inertia forces of the airs W2 and W3.

However, in this embodiment, the exhaust duct 27 is provided thereinside with plural air guiding walls 27a for forming plural airflow paths 27b within a cross section extending along the inflow and outflow directions of the air (cross section shown in FIG. 1). The plural airflow paths 27b have different flow path lengths from each other. More specifically, the farther the airflow path is from the lamp 1, the longer the flow path length is.

Here, when a direction perpendicular to the sheet surface of FIG. 1 is defined as an up and down direction, the air guiding walls 27a extend from an upper surface (ceiling surface) to a lower surface (bottom surface) of the exhaust duct 27 to divide the inner space of the exhaust duct 27. However, as long as the air guiding walls 27a serve to guide most of the air flowing inside each airflow path 27b to the outflow opening OUT, they may be formed at least part of the region between the upper surface and the lower surface of the exhaust duct 27. That is, parts of the airflow paths 27b adjacent to each other may be connected to each other. Such a configuration is also regarded as the one including plural airflow paths formed inside the exhaust duct 27.

Forming such plural airflow paths 27b inside the exhaust duct 27 distributes the airs W2 and W3 that have flowed in from the inflow opening IN into the plural airflow paths 27b. Even with the action of the inertia forces of the flowing-in airs W2 and W3, the air distributed to each airflow path 27b flows along the air guiding wall 27a facing the respective airflow path 27b, that is, the air is guided by the air guiding wall 27a, toward the outflow opening OUT.

This can reduce unevenness in flow rate of the air flowing out from the outflow opening OUT (that is, from the plural airflow paths 27b) toward the entire air suction plane of the exhaust fan 18. In other words, the flow rate is made even.

Accordingly, generation of wind roar or turbulence at the exhaust fan 18 is suppressed, and noise from the projector can be reduced.

Further, suppressing the generation of turbulence enables sufficient cooling of the lamp 1 even at a low rotating speed, without deteriorating the characteristics (P-Q characteristics) of the exhaust fan 18. Therefore, a further noise reduction and a higher cooling efficiency can be realized.

Further in the lamp 1, the light emitting portion 41A generates a larger amount of heat than that generated in the neck portion. Therefore, the air W2 after cooling the light emitting portion 41A has a higher temperature than that of the air W3 after cooling the neck portion. If the air W2 is exhausted to the outside from the exhaust air outlet 24a of the second side plate 24 as it is, a high-temperature air may be blown to a user, or the second side plate 24B may be heated to a high temperature.

Figure 2:
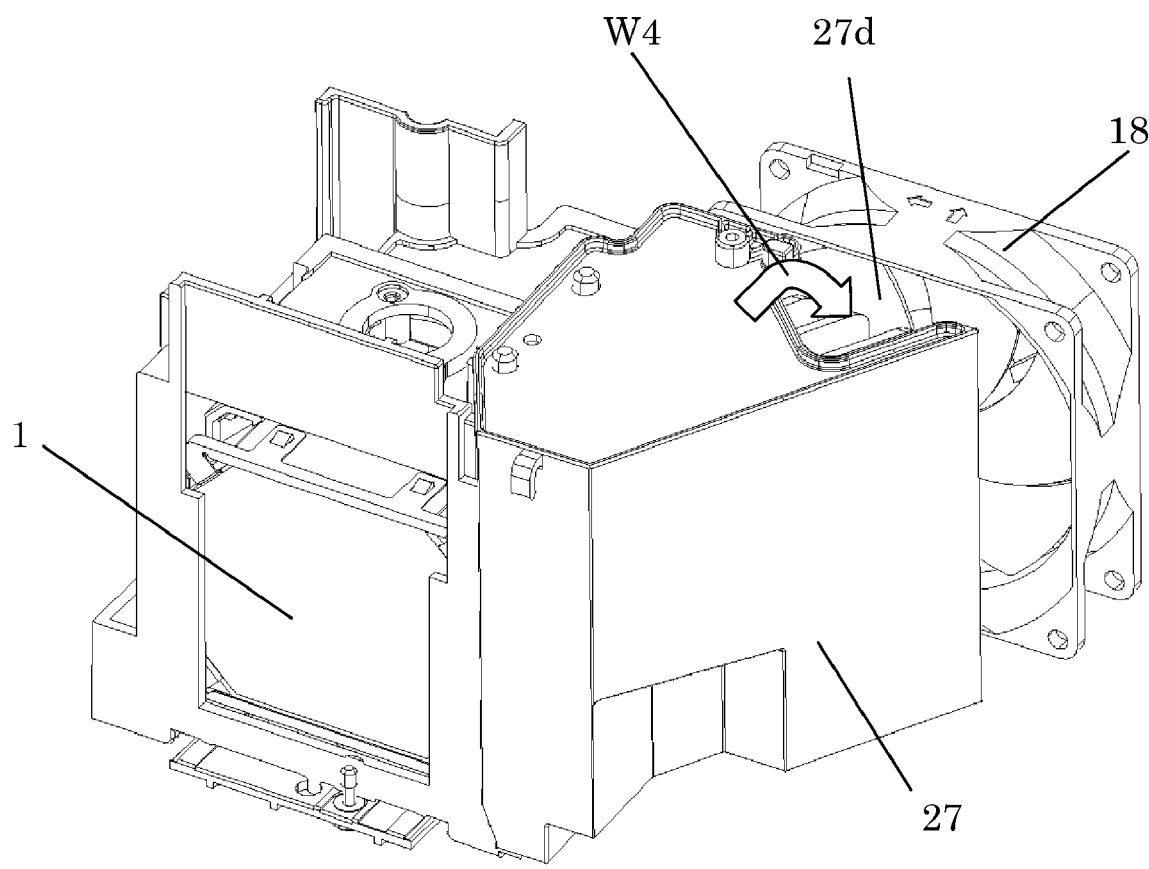
FIG. 2 is a perspective view showing part of the cooling structure of Embodiment 1.

To solve these problems, in this embodiment, as shown in FIG. 2, another air inlet 27d is provided to the exhaust duct 27 in addition to the inflow opening IN for the airs W2 and W3 from the lamp 1. An air W4 having a lower temperature than that of the air W2 flows in from the air inlet 27d to be mixed with the air W2. This makes the temperature of the air (W2+W4) sucked into the exhaust fan 18 lower than the temperature of the air W2, resulting in a lowered temperature of the exhausted air.

When the rotating blades of the exhaust fan 18 pass the vicinity of the stationary exhaust duct 27, interference noise is generated, which invites an increase in noise. This interference noise has peaks at a frequency of an integral multiple of "the number of the blades x the rotating speed thereof". In this embodiment, since the air guiding walls 27a are provided which extend to the outflow opening OUT of the exhaust duct 27 facing the exhaust fan 18, the interference noise may be generated more easily.

However, in this embodiment, the outflow opening OUT of the exhaust duct 27 and the air guiding walls 27a are separated by 5 mm or more (denoted at H in FIG. 1) from the exhaust fan 18 in order to suppress the generation of the interference noise.

Embodiment 2

Figure 3:
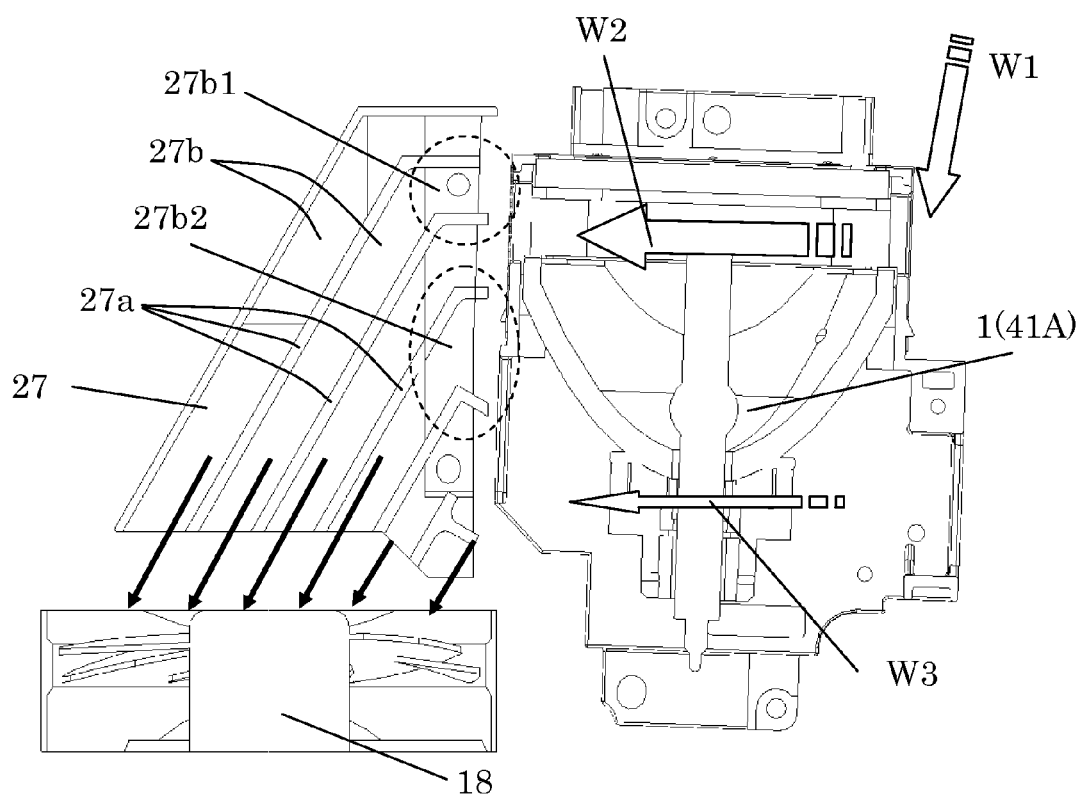
FIG. 3 is a sectional view showing part of a cooling structure in a liquid crystal projector that is a second embodiment (Embodiment 2) of the present invention.

FIG. 3 shows the cooling structure in the vicinity of the lamp 1 and the exhaust fan 18 in a liquid crystal projector that is a second embodiment (Embodiment 2) of the present invention. Constituent elements identical to or having similar functions to those in Embodiment 1 are designated by the same reference numerals as those in Embodiment 1.

The flow of the air W2 flowing inside the reflector 42 to cool the light emitting portion 41A and the like (hereinafter referred to as "airflow W2" in this embodiment) is formed of the combination of an airflow which is blown from the lamp cooling fan 14 disposed at an upstream side from the lamp 1 and an airflow which is sucked into the exhaust fan 18. In contrast, the flow of the air W3 for cooling the neck portion (hereinafter referred to as "airflow W3" in this embodiment) is an airflow which is sucked into the exhaust fan 18.

Therefore, the flow volume of the airflow W2 is larger than that of the airflow W3. This flow volume difference may generate unevenness in flow rate of the airflow from the exhaust duct 27 toward the exhaust fan 18.

In this embodiment, the plural airflow paths 27b formed by the plural air guiding walls 27a have different opening areas from each other depending on the flow volumes of the airflows flowing into the respective airflow paths 27b. That is, the opening area at an inflow region of the airflow path 27b1 into which the airflow W2 (first airflow) mainly flows is made smaller than the opening area at an inflow region of the airflow path 27b2 into which the airflow W3 (second airflow), whose flow volume is smaller than that of the airflow W2, mainly flows.

This prevents the airflow W2 having a large flow volume from flowing into only one airflow path 27b and distributes the airflow W2 to some airflow paths 27b. As a result, the unevenness in flow rate of the airflow toward the exhaust fan 18 is further reduced. To divide the airflow W2 into some parts, an air guiding wall 27a may be provided to the center or its vicinity of the airflow W2.

On the other hand, on the side of the airflow W3 having a smaller flow volume, the opening area of the airflow path 27b is made relatively large. This makes it possible to collect most part of the airflow W3 into this airflow path 27b and to guide it toward the exhaust fan 18, thereby reducing the unevenness in flow rate of the airflow toward the exhaust fan 18.

These features make the flow rate of the airflow flowing into the exhaust fan 18 more even. As a result, the generation of wind roar or turbulence at the exhaust fan 18 is effectively suppressed, and a low-noise projector can be realized.

Embodiment 3

Figure 4:
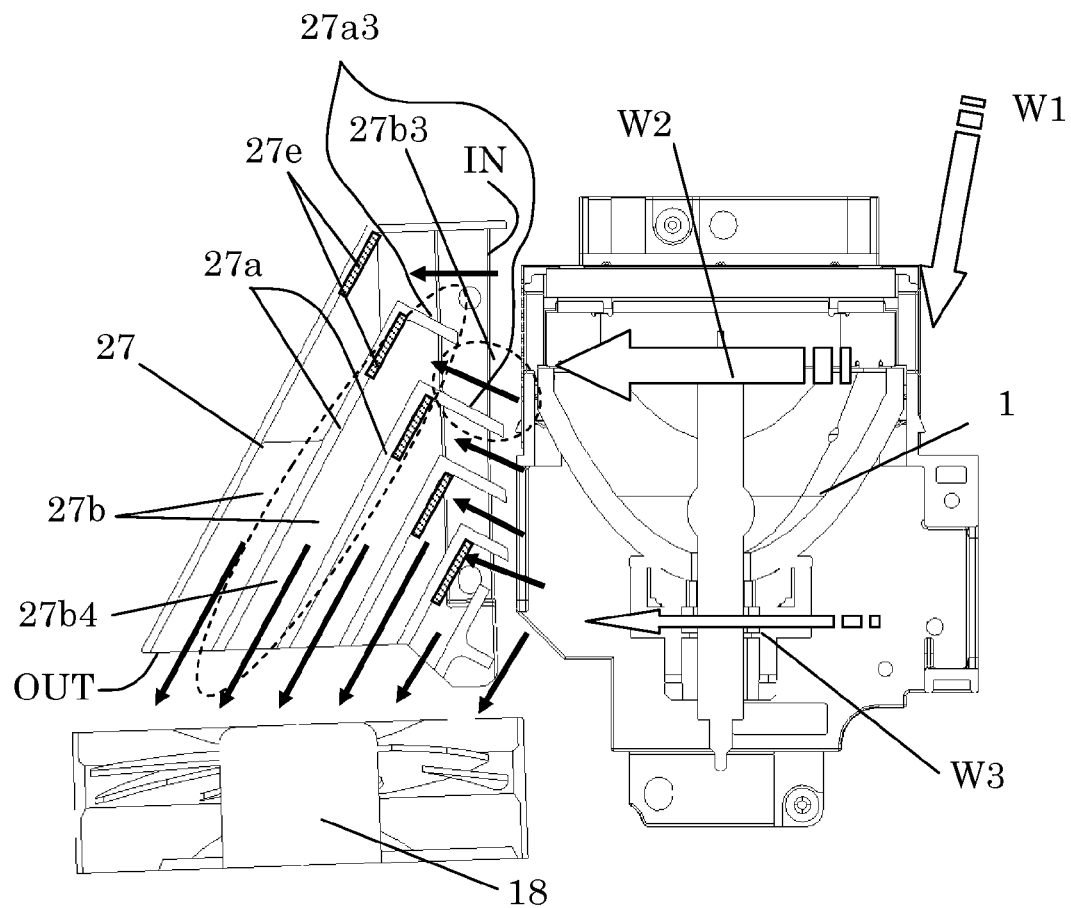
FIG. 4 is a sectional view showing part of a cooling structure in a liquid crystal projector that is a third embodiment (Embodiment 3) of the present invention.

FIG. 4 shows the cooling structure in the vicinity of the lamp 1 and the exhaust fan 18 in a liquid crystal projector that is a third embodiment (Embodiment 3) of the present invention. Constituent elements identical to or having similar functions to those in Embodiment 1 are designated by the same reference numerals as those in Embodiment 1.

Leakage light from the lamp 1 in the liquid crystal projector gives a user an unpleasant feeling. Further, the leakage light illuminating the projection surface lowers the contrast of projected images. Therefore, in this embodiment, each air guiding wall 27a provided inside the exhaust duct 27 is configured such that a portion closer to the inflow opening IN than the outflow opening OUT is formed as a wall portion 27a3 extending toward an opposite side to the outflow opening OUT. In FIG. 4, since the outflow opening OUT is located on the lower side relative to the inflow opening IN, the wall portion 27a3 extends upward relative to the inflow opening IN (that is, upward when viewed from the inflow opening IN).

The air guiding wall 27a extends in the outflow direction of the air on a downstream side from the wall portion 27a3. Therefore, each airflow path 27b is formed by a first airflow path portion 27b3 extending from the inflow opening side along the wall portion 27a3 and a second airflow path portion 27b4 extending therefrom to the downstream side, as indicated in the drawing by encircling them with dotted-lines.

The leakage light from the lamp 1 enters the first airflow path portion 27b3 inside the exhaust duct 27, but most of it is reflected by the wall portion 27a3 and returned toward the lamp 1. Even if part of the leakage light enters the second airflow path portion 27b4 and proceeds toward the outflow opening side by repeated reflections on the air guiding wall 27a along the airflow path portion 27b4, the light is attenuated through the repeated reflections before it reaches the outflow opening OUT, and therefore it will not be a problem.

In FIG. 4, in an area facing the first airflow path portion 27b3 in a part of each air guiding wall 27a which extends along the second airflow path portion 27b4, a reflection reducing structure 27e is provided. The reflection reducing structure 27e is realized by bonding a diffusion sheet or a felt sheet or by applying a low reflection paint on the air guiding wall 27a.

The configuration described above enables smooth exhaust of the air while suppressing the leakage light from the lamp 1 from emerging through the outflow opening OUT (and the exhaust fan 18) to the outside of the projector.

As described above, according to each of the embodiments, a projector capable of achieving good air exhaust performance (i.e., cooling performance) and noise reduction at the same time can be realized even when a bent-type exhaust duct is used.

That is, according to each of the embodiments, forming the plural airflow paths inside the bent-type duct to divide the airflow in the duct can reduce the unevenness in flow rate of the flowing-out air due to the inertia force of the air flowing into the duct. This suppresses the generation of wind roar or turbulence at the exhaust fan, and realizes a small image projection apparatus with low noise.

Furthermore, the present invention is not limited to these embodiments and various variations and modifications may be made without departing from the scope of the present invention.

For example, the heat generating member is not limited to a light source lamp, but may be a light modulation element such as a liquid crystal panel, a component constituting an optical system such as an optical element, or an electrical component such as a power supply ballast or a CPU.

The number of the air guiding wall is also not limited to that shown in FIGS. 1, 3 and 4, but may be at least one.

Moreover, the exhaust fan is not limited to an axial flow fan, but may be any of other fans such as a sirocco fan. The reflective liquid crystal panel may be substituted by a transmissive liquid crystal panel or a digital micromirror device (DMD).

This application claims the benefit of Japanese Patent Application No. 2007-196744, filed on Jul. 27, 2007, which is hereby incorporated by reference herein in its entirety.

What is claimed is:

1. An image projection apparatus, comprising:
   a heat generating member disposed inside the apparatus;
   an exhaust fan exhausting an air that has cooled the heat generating member to the outside of the apparatus; and
   a duct guiding the air from the heat generating member to the exhaust fan,
   wherein an outflow opening of the duct is oriented in a direction different from an inflow direction of the air into an inflow opening thereof, and
   wherein at least one air guiding wall is provided inside the duct, which forms plural airflow paths within a cross section extending along the inflow direction and an outflow direction of the air.

2. An image projection apparatus according to claim 1, wherein the plural airflow paths have flow path lengths different from each other.

3. An image projection apparatus according to claim 1, wherein a first airflow and a second airflow having a flow volume smaller than that of the first airflow flow into the duct, and
   wherein, among the plural airflow paths, the airflow path into which the first airflow flows has an opening area smaller than that of the airflow path into which the second airflow flows.

4. An image projection apparatus according to claim 1, wherein the air guiding wall includes a wall portion that is closer to the inflow opening than the outflow opening and extends toward an opposite side to the outflow opening.

5. An image projection apparatus according to claim 1, wherein the heat generating member is a light source lamp.

6. An image projection apparatus according to claim 1, wherein the exhaust fan is an axial flow fan.

7. An image display system, comprising:
   an image projection apparatus according to claim 1; and
   an image supply apparatus that supplies image information to the image projection apparatus.

* * * * *